(12) United States Patent
Pramod et al.

(10) Patent No.: US 10,640,143 B2
(45) Date of Patent: May 5, 2020

(54) CURRENT REGULATORS FOR PERMANENT MAGNET DC MACHINES

(71) Applicant: STEERING SOLUTIONS IP HOLDING CORPORATION, Saginaw, MI (US)

(72) Inventors: Prerit Pramod, Saginaw, MI (US); Varsha Govindu, Saginaw, MI (US); Rakesh Mitra, Saginaw, MI (US); Nithil Babu Nalakath, Kokomo, IN (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 29 days.

(21) Appl. No.: 16/013,370

(22) Filed: Jun. 20, 2018

(65) Prior Publication Data

US 2019/0389505 A1 Dec. 26, 2019

(51) Int. Cl.
| | |
|---|---|
| *B62D 5/04* | (2006.01) |
| *H02P 6/17* | (2016.01) |
| *H02P 6/28* | (2016.01) |
| *H02P 21/00* | (2016.01) |
| *H02K 23/04* | (2006.01) |
| *H02K 29/08* | (2006.01) |

(52) U.S. Cl.
CPC .......... *B62D 5/0463* (2013.01); *H02K 23/04* (2013.01); *H02K 29/08* (2013.01); *H02P 6/17* (2016.02); *H02P 6/28* (2016.02); *H02P 21/0003* (2013.01); *H02P 2207/05* (2013.01)

(58) Field of Classification Search
CPC . B62D 5/0463; H02P 6/17; H02P 6/28; H02P 21/0003; H02K 23/04; H02K 29/08
USPC ......................................................... 701/41
See application file for complete search history.

(56) References Cited

U.S. PATENT DOCUMENTS

| | | | | |
|---|---|---|---|---|
| 1,030,828 | A * | 6/1912 | Persohn .................... | G02C 5/12 |
| | | | | 351/75 |
| 7,067,795 | B1 * | 6/2006 | Yan ........................ | G02F 1/0123 |
| | | | | 250/225 |
| 10,277,140 | B2 * | 4/2019 | Jia ...................... | H02M 3/33507 |
| 2012/0277942 | A1 * | 11/2012 | Vilar ....................... | B60L 50/13 |
| | | | | 701/22 |
| 2018/0316291 | A1 * | 11/2018 | Pramod .................. | B62D 5/046 |
| 2019/0135331 | A1 * | 5/2019 | Pramod ................ | B62D 5/0481 |

* cited by examiner

*Primary Examiner* — Yazan A Soofi
(74) *Attorney, Agent, or Firm* — Dickinson Wright PLLC

(57) ABSTRACT

Technical solutions are described for a motor control system to control a permanent magnet DC (PMDC) machine. An example motor control system includes one or more sensors for measuring an output current of the PMDC machine. The motor control system further includes a current regulator that generates a voltage command corresponding to an input current command for generating an amount of torque using the PMDC machine. The current regulator includes a current command compensator that generates a first voltage command based on the input current command received by the current regulator. The current regulator further includes a feedback compensator that generates a second voltage command based on the output current measured by the one or more sensors. The current regulator also includes an adder configured that generates the voltage command by adding the first voltage command and the second voltage command.

16 Claims, 17 Drawing Sheets

US 10,640,143 B2

CURRENT REGULATORS FOR PERMANENT MAGNET DC MACHINES

BACKGROUND

The present application is generally related to improvements in operation of current regulators for permanent magnet dc (PMDC) machines, particularly for improving tuning of system dynamic responses for systems that use PMDC motor drives, such as electric power steering (EPS) systems.

PMDC machines are widely used in the EPS systems. Electric drive systems employing such machines require fewer sensors and relatively low-cost electronic circuitry, and are still able to deliver good performance through the entire operating space.

Torque control of PMDC machines is typically performed indirectly through current regulation utilizing current measurements. While steady state current tracking can be typically achieved by using proportional-integral (PI) controllers that act on the current error, the dynamic performance of the current control system is not satisfactory.

SUMMARY

According to one or more embodiments, an example motor control system includes one or more sensors for measuring an output current of the PMDC machine. The motor control system further includes a current regulator that generates a voltage command corresponding to an input current command for generating an amount of torque using the PMDC machine. The current regulator includes a current command compensator that generates a first voltage command based on the input current command received by the current regulator. The current regulator further includes a feedback compensator that generates a second voltage command based on the output current measured by the one or more sensors. The current regulator also includes an adder configured that generates the voltage command by adding the first voltage command and the second voltage command.

According to one or more embodiments, a method for controlling operation of a permanent magnet DC (PMDC) machine includes measuring, using one or more sensors, an output current of the PMDC machine. The method further includes generating, by a current regulator, a voltage command in response to receiving an input current command, and applying the voltage command to the PMDC machine for generating an amount of torque corresponding to the input current command. Generating the voltage command includes generating, by a current command compensator, a first voltage command based on the input current command received by the current regulator. Generating the voltage command further includes generating, by a feedback compensator, a second voltage command based on the output current measured by the one or more sensors. Generating the voltage command further includes generating, by an adder, the voltage command by adding the first voltage command and the second voltage command.

According to one or more embodiments, a steering system includes a permanent magnet DC (PMDC) motor, and one or more sensors for measuring an output current of the PMDC motor. The steering system further includes a motor control system that generates a voltage command, the voltage command is applied to the PMDC motor for generating an amount of torque. The motor control system includes a current regulator that receives an input current command, the voltage command corresponding to the input current command. The motor control system further includes a current command compensator that generates a first voltage command based on the input current command. The motor control system further includes a feedback compensator that generates a second voltage command based on the output current measured by the one or more sensors. The motor control system further includes an adder that generates the voltage command by adding the first voltage command and the second voltage command.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
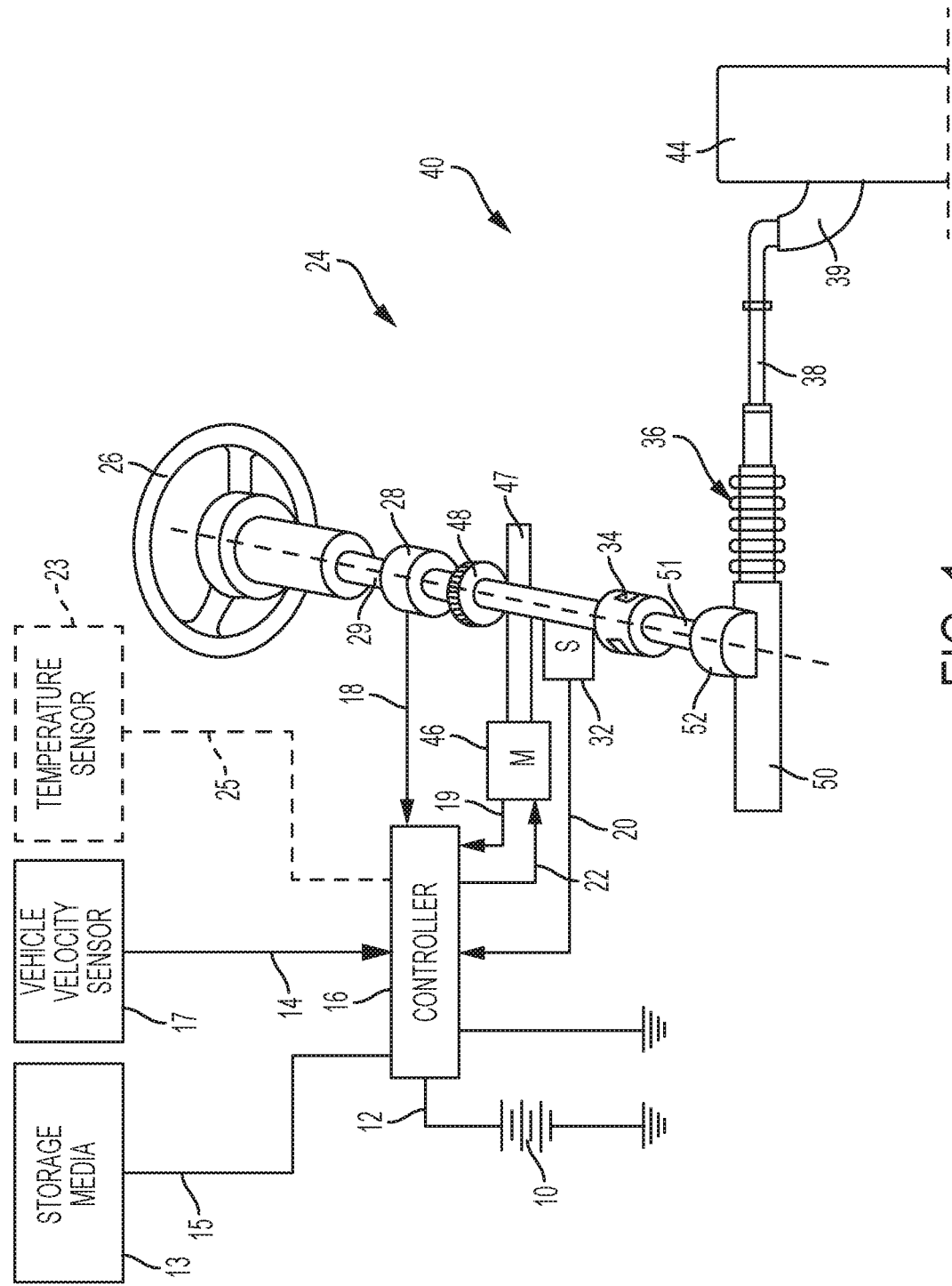
FIG. 1 is an exemplary embodiment of an electric power steering system according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The torque control of PMDC machines is typically performed indirectly through current regulation utilizing current measurements. While steady state current tracking is typically achieved through the use of proportional-integral (PI) type controllers that act on the current error, the dynamic performance of the current control system may not be satisfactory. Providing dynamic response is more complex due to the nonlinearities in PMDC machines, which are caused by factors such as the brush drop voltage and the variation of machine parameters due to changing operating conditions. Typical current control designs are not able to maintain a consistent current control frequency response through the operating space of the machine, and also do not have enough degrees of freedom to be able to change the response characteristics (for instance, being able to achieve a specific current response shape such as a second order transfer function response). The technical solutions described herein address such technical challenges.

The technical solutions described herein facilitate a motor control system two degree of freedom (2DOF) feedback current control architecture. Further, specific configurations of the 2DOF motor control system are described to facilitate the closed-loop current control system to be configured into different response characteristics, with additional ability to trade-off between performance parameters like robustness, disturbance rejection and noise transmission characteristics. The specific configurations described herein further facilitate easier tunability of the control system, thus reducing the time taken by a user, such as a technician or any other personnel for tuning the current control loop in a system using the motor control system. For example, the motor control system for the PMDC machine may be part of an electric power steering (EPS) system, a water pump, an industrial belt, an escalator, or any other such system using a PMDC.

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet DC motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
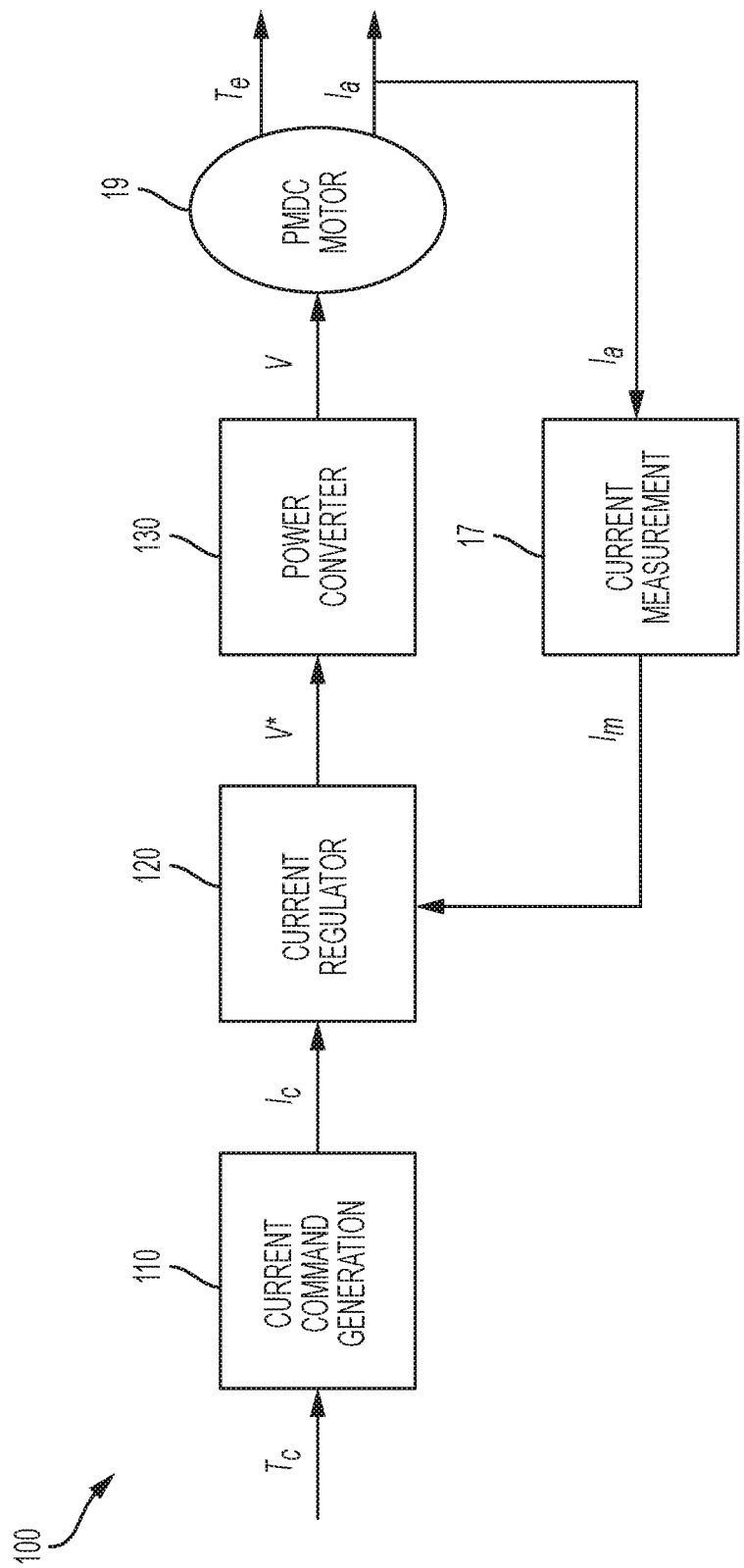
FIG. 2 depicts block diagram of an architecture of a motor control system performing torque (and current) control of PMDC machines according to one or more embodiments.

FIG. 2 depicts block diagram of an architecture of a motor control system performing torque (and current) control of PMDC machines according to one or more embodiments. The motor control system 100 depicted is shown to control the PMDC motor 19, which may/may not be considered as part of the motor control system 100. Further, current measurement sensors 17 are depicted that measure output current ($I_a$) at the motor 19. The torque control of the PMDC motor 19 is implemented via feedback current regulation using the current measurements. The torque command requested ($T_c$), for example from the EPS system 40, is converted into an equivalent current command by a current command generator 110. In one or more examples, the current command generator 110 uses the model of the machine (and additional power management functions), which is preprogrammed in the current command generator 110. The current command generator 110 accordingly generates a corresponding current command ($I_c$) that is sent to a current regulator 120.

The current regulator 120 acts upon the current command ($I_c$) and the measured current ($I_a$) to generate voltage commands (V*), that are converted into voltages by power converter circuits 130 that use pulse width modulation (PWM) schemes to apply the voltage command V to the terminals of the PMDC machine 19. The PMDC machine 19 then generates actual currents ($I_a$) and therefore electromagnetic torque ($T_e$). The generated currents ($I_a$) are sensed through the current measurement sensor 17 circuitry and then fed back to the current regulator 120 in order to perform feedback current control described above.

Typically, a compensator, such as proportional-integral (PI) controllers that only act on the current error are used as the regulator 120 for implementing feedback current control. Such compensators are called one degree of freedom (1DOF) compensators, since only the current error is processed to produce the control signal (voltage command V*). Thus, the tuning capability of the motor control system 100 is limited.

The technical solutions described herein address the technical challenges described herein by providing additional degrees of freedom, for example by separate processing of the current command ($I_c$) and the measured current signals ($I_a$). The one or more embodiments in the above case can provide a two degree of freedom (2DOF) feedback current control architecture.

Figure 3:
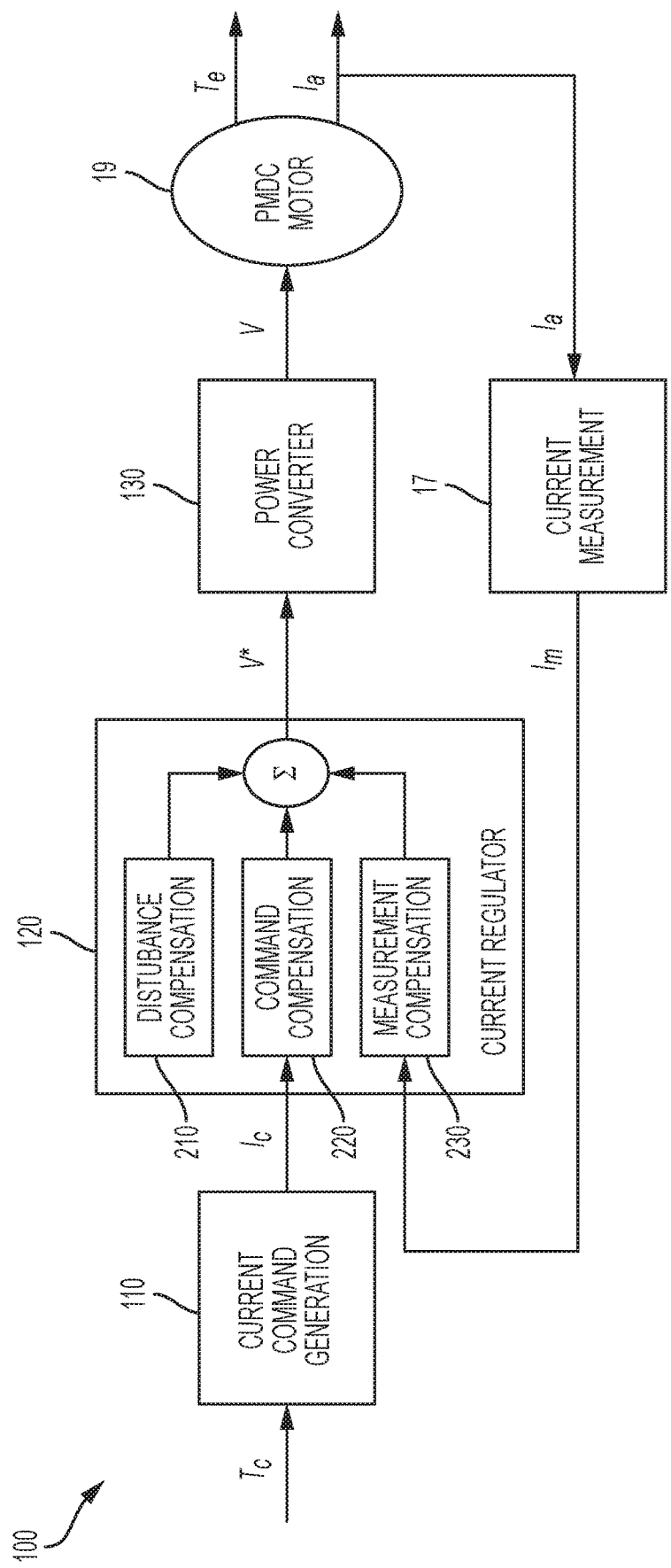
FIG. 3 depicts a block diagram of an architecture of a motor control system that provides a two degree of freedom (2DOF) feedback current control according to one or more embodiments.

FIG. 3 depicts a block diagram of an architecture of a motor control system that provides a two degree of freedom (2DOF) feedback current control according to one or more embodiments. As is illustrated, the current regulator 120 includes a disturbance compensator 210, a command compensator 220, and a measurement compensator 230, among other modules and components. Each of these modules operate separately on respective components of input signals to the current regulator 120 to generate the voltage commands V*. The command compensator 220 operates on the input current command $I_c$ generated by the current command generator 110. The measurement compensator 230 operates on the measured current signal $I_a$ from the current sensor 17. Further, the disturbance compensator operates on an estimated disturbance d in the electrical circuit of the motor control system 100. Each of the compensators 210, 220, and 230, generate respective voltage command components which are added together (240) to generate the voltage command V*.

In the case of the EPS system 40, the plant is the electrical sub-system of the PMDC machine 19, for which the governing equations are given by:

$$v = L\frac{di_a}{dt} + Ri_a + K_e\omega_m + v_B$$

$$T_e = K_e i_a$$

Here, $K_e$, R, and L are the motor BEMF constant, resistance and inductance respectively. Further, v, $i_a$ and $T_e$ are the voltage input, current and electromagnetic torque of the motor 19. The brush voltage drop term $v_B$ is non-linear and is computed as, $$v_B = \sigma(i_a)V_0\left(1 - e^{-\left|\frac{i_a}{I_0}\right|}\right)$$

where the term $\sigma(i_a)$ refers to the sign of current. The quantities $V_0$ and $I_0$ are state variables of the function. The electrical parameters of the motor 19, namely the back-EMF constant or torque constant $K_e$, resistance R and inductance L vary dynamically, even though the variation is slow, with the operating condition of the motor 19.

For example, the governing equations for parameter variations for a given magnet temperature $\theta_{Tm}$ is, $$K_e = \gamma_{K_e}(K_{en}(1+\alpha_M(\theta_{Tm}-\theta_n)))$$

Here, the variable $\gamma_{K_e}$ is a scaling factor accounting for magnetic saturation, and is a function of motor current ($I_a$). The constant $\alpha_M$ is the thermal coefficient of the permanent magnet material used in the motor 19.

Further, the inductance of the motor 19 is summarized by the following equation, $$L = \gamma_L L_n$$

where, the variable $\gamma_L$ is a scaling factor for inductance based on the magnetic saturation characteristics of the motor 19, and is a function of the motor current ($I_a$).

Further yet, the motor circuit resistance is given by the following equation:

$$R = R_{FET}(1+\alpha_{si}(\theta_{TSi}-\theta_n))+R_m(1+\alpha_{Cu}(\theta_{TCu}-\theta_n))$$

It should be noted that the above equation gives the motor circuit resistance rather than the resistance of the motor windings only. Further, while not explicitly stated hereafter, it should be understood that the aforementioned models of the parameter variations are employed to continuously estimate the motor parameters in real-time, which results in improved estimation of the various signals.

When designing the motor control system 100, to overcome the nonlinearities in the above operating equations, in one or more examples, the non-linear brush-drop term may be linearized and a piece-wise observer structure may be employed. Alternatively, the brush-drop along with BEMF may be lumped into a total disturbance term d. Accordingly, the transfer function representation of the machine (plant) model is given by, $$V(s) = P(s)I_a(s) + D(s)$$
$$= (Ls + R)I_a(s) + D(s)$$

Figure 4:
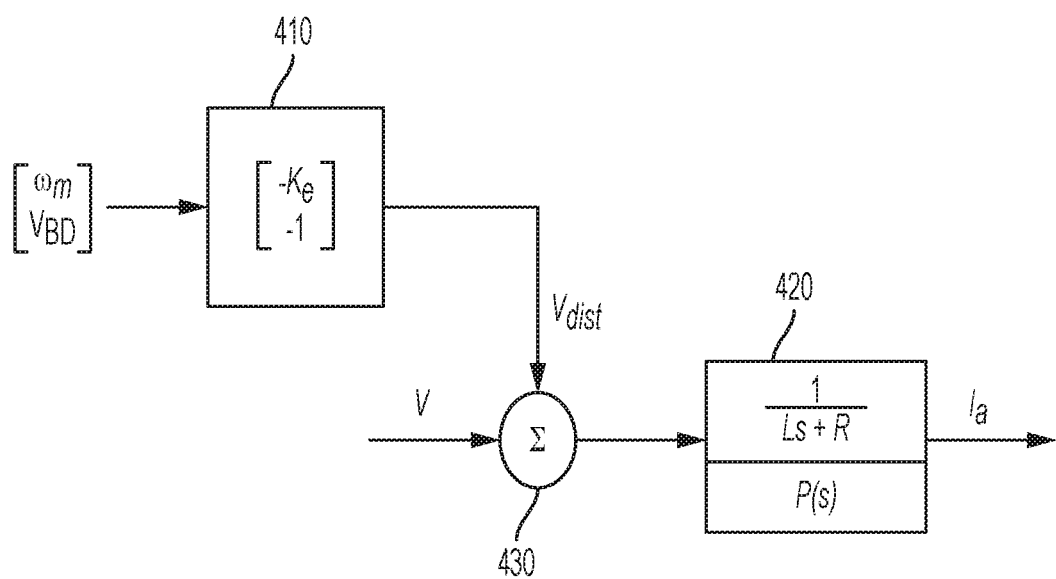
FIG. 4 depicts a block diagram of the plant model of a PMDC machine represented by the above equations according to one or more embodiments.

FIG. 4 depicts a block diagram of the plant model of a PMDC machine represented by the above equations according to one or more embodiments. As depicted, the plant (block 420) generates an output current (Ia) for received voltage command, which is a sum (at block 430) of an input voltage command and a disturbance component ($V_{dist}$) caused by the disturbance term d (block 410). Another representation of the above model using state-space representation is given by, $$\dot{x} = Ax + Bu + Ed$$
$$\frac{di_a}{dt} = \left[-\frac{R}{L}\right]i_a + \left[\frac{1}{L}\right]v + \left[\frac{1}{L}\right]d$$

Figure 5:
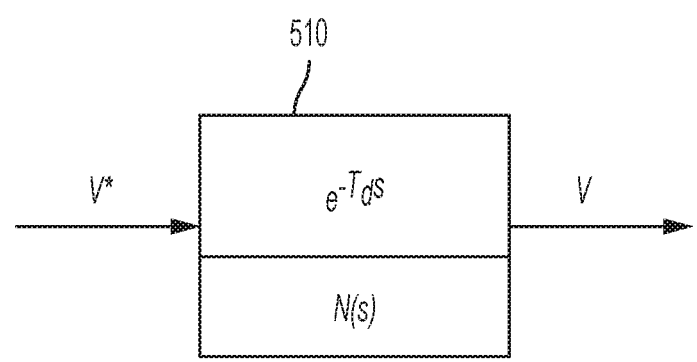
FIG. 5 depicts a operating model of a power converter according to one or more embodiments.

FIG. 5 depicts a operating model of a power converter according to one or more embodiments. The block 510 in FIG. 5 depicts mathematical model of how a power converter 130 generates a voltage command V for the motor 19 given an input voltage command V* from the power regulator 120. An effect of the power converter is that the actual voltage is delayed due to the discrete nature of the operation of voltage conversion. This time delay may be modeled as a transport lag of $T_d$ which is typically an integer multiple of the PWM period $T_p$ (which is the inverse of the PWM frequency $f_p$). Additionally, nonlinearities introduced by the power converter 130 are not very substantial in affecting the current control design, and are overcome using voltage compensation techniques that are presently known. Accordingly, a model of the power converter 130 includes the transport lag, which may be modeled as a transfer function using the Pade approximation of appropriate order. For instance, the first order Pade approximation is given as follows $$N(s) = e^{-T_d s} \approx \frac{1-T_d s}{1+T_d s}$$

Figure 6:
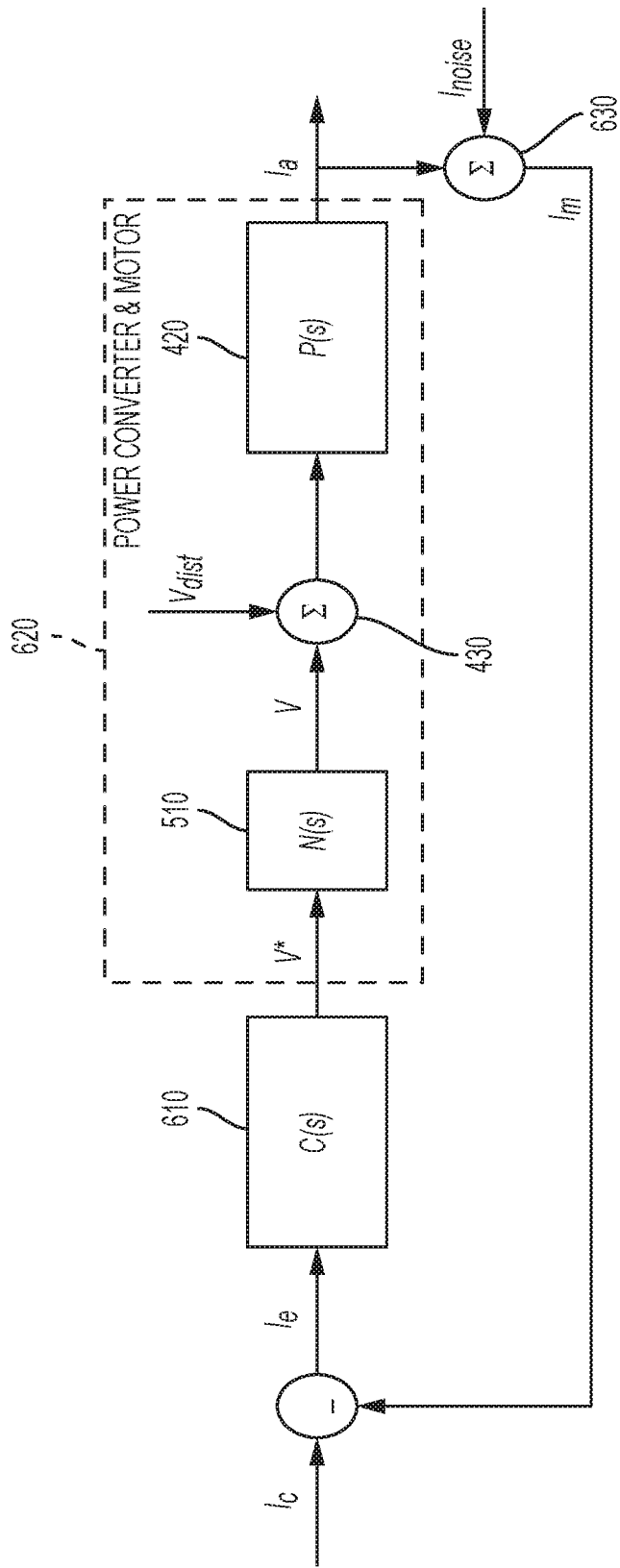
FIG. 6 depicts a block diagram of an operational dataflow for a 1DOF motor control system according to one or more embodiments.

FIG. 6 depicts a block diagram of an operational dataflow for a 1DOF motor control system according to one or more embodiments. In the illustration, block 610 represents the current regulator 120 and the block 620 represents the power converter 130 and the electrical plant model of the motor 19. The block 610 receives a current error ($I_e$) which is a difference between the input current command ($I_c$) and a measured current ($I_m$). Here, the measured current ($I_m$) is depicted as the output current ($I_a$) being modified by an added noise component ($I_{noise}$) at block 630. The output current ($I_a$) is shown to be generated by the block 620 as a result of the voltage command V* from the current regulator block 610. The block 620 receives the voltage command V*, which is converted to the voltage command V by the power converter model 510. Further, the disturbance term d causes the voltage command V to change by a disturbance voltage component $V_{dist}$ being added at block 430. The plant model 420 generates the output current ($I_a$) as a result of the received disturbed voltage command.

While such compensators (in FIG. 6) ensure steady state current command tracking, their dynamic performance may not be satisfactory especially due to time variation of system parameters as well as due lack of tuning flexibility for optimizing the tracking as well as disturbance rejection responses.

Figure 7:
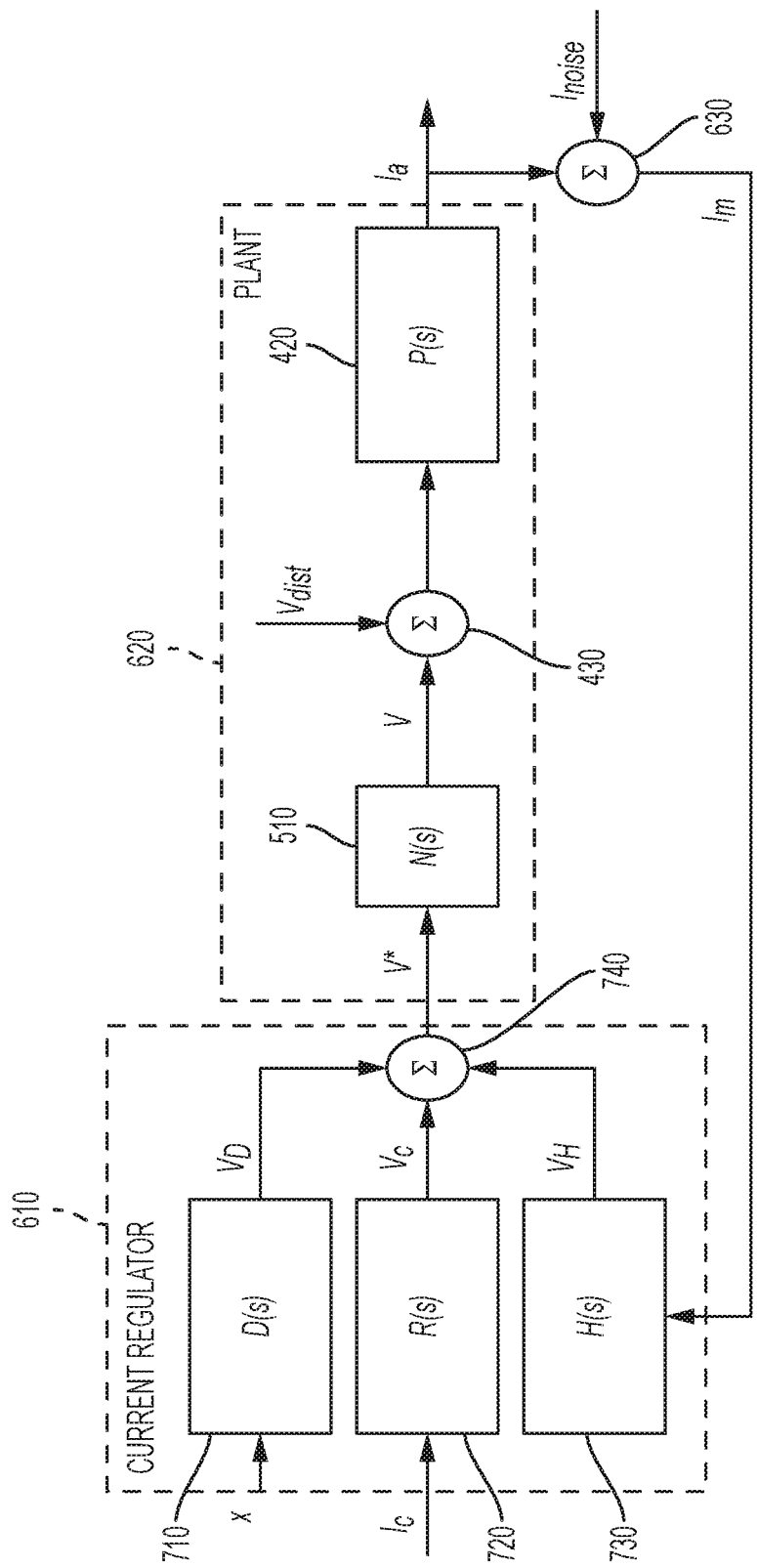
FIG. 7 depicts a block diagram depicting an operational dataflow for a 2DOF motor control system according to one or more embodiments.

FIG. 7 depicts a block diagram depicting an operational dataflow for a 2DOF motor control system according to one or more embodiments. As described earlier, the motor control system 100 includes a 2DOF current regulator 120 that includes independent compensators 210, 220, and 230 for the commanded current, the measured current, and the disturbance term, respectively. In FIG. 7, block 710 represents the disturbance compensator 210, block 720 represents the command compensator 220, and block 730 represents the measurement compensator 230. The disturbance compensation provided by block 710 may be feedforward in nature, or observer based disturbance compensation.

The voltage command output of the 2DOF current regulator 120 is:

$$V^* = V_D + V_C + V_H$$
$$= DX + RI_c + HI_m$$

where the frequency term s has been omitted. Here, X is a general signal or a set of signals, which could represent either a predicted feedforward term or an output of another controller such as a disturbance observer. Here, $V_D$ is generated by the disturbance compensator block 710, $V_C$ is generated by the command compensator block 720, and $V_H$ is computed by the measurement compensator block 730. The resulting voltage command outputs are subsequently added at block 740 to generate the voltage command V* that is received by the power converter. It should be noted that in one or more examples, the block 610 may be represented to include only the blocks 720 and 730 for the command compensator 220 and the measurement compensator 230, with the block 710 being external to the regulator block 610.

Figure 8:
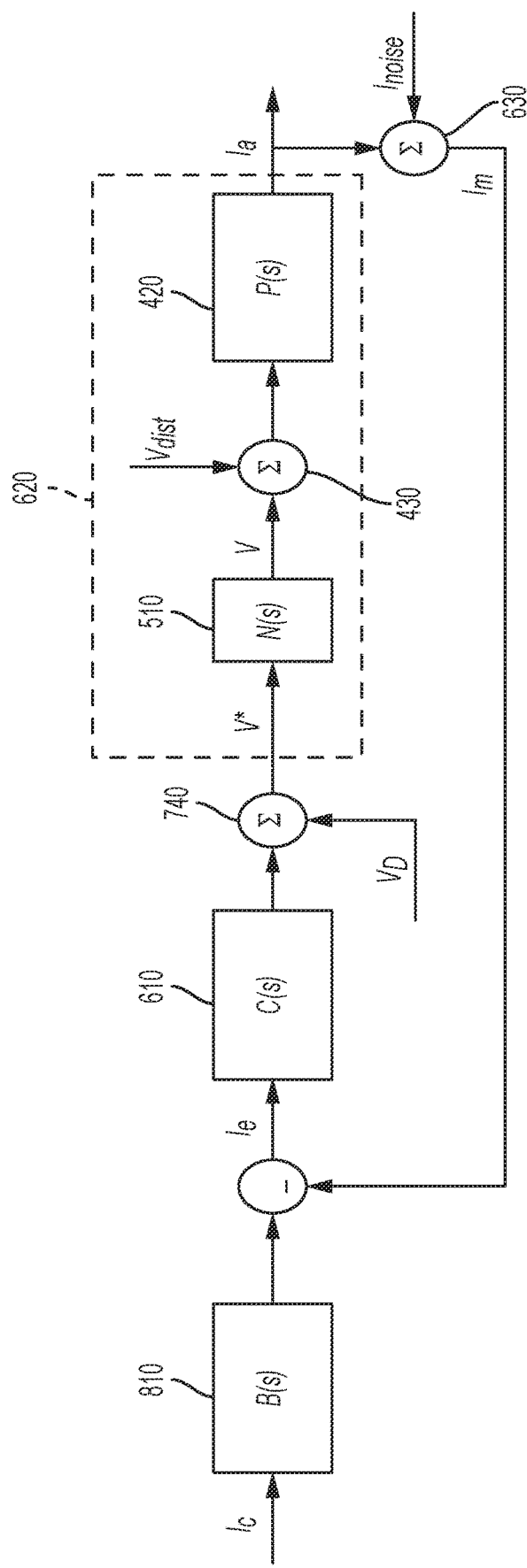
FIG. 8 depicts a specific configuration of a 2DOF motor control system using a pre-compensator according to one or more embodiments.

FIG. 8 depicts a specific configuration of a 2DOF motor control system using a pre-compensator according to one or more embodiments. The illustration includes the blocks of the motor control system 100 discussed so far, and in addition, includes a pre-compensator 810. The pre-compensator 810 operates on the current command ($I_C$) compensator, the result of which is used to compute a current error ($I_e$) by subtracting the measured current ($I_m$). The current error ($I_e$) is then received by the current regulator 610. The operation of the pre-compensator 810 includes changing the input signal, in this case the current command using a gain factor B, which may be a dynamically adjustable function (such as a dynamic transfer function). In the depicted example, the current regulator 610 is a typical 1DOF compensator. In addition, in this configuration, the disturbance voltage ($V_D$) gets added at 740. Accordingly, the voltage command of the current regulator 610 with the pre-compensator 810 can be expressed as follows:

$$V^* = DX + C(BI_c - I_m)$$
$$= DX + CBI_c - CI_m$$

Accordingly, in the configuration of FIG. 8, the current command and the measured current are separate parameters that can be used to adjust the current regulation, by controlling C and B (=2 DOF).

Figure 9:
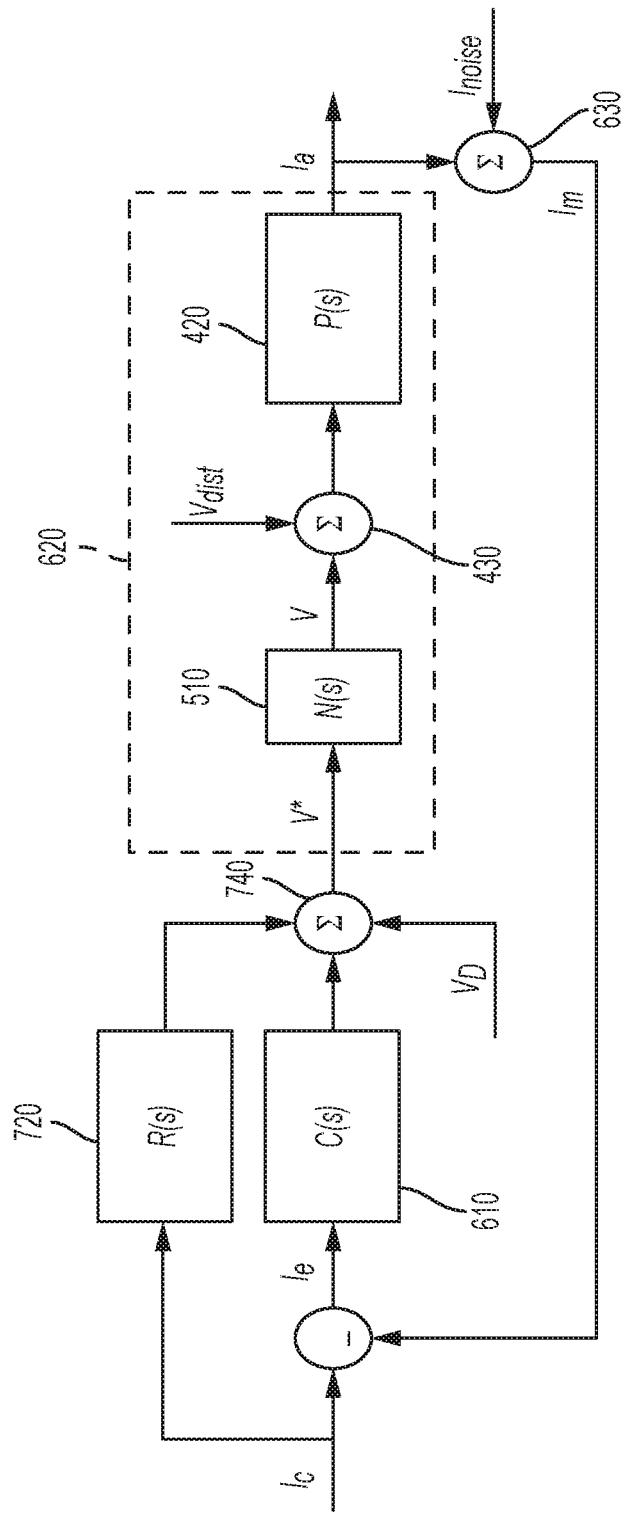
FIG. 9 depicts another configuration of a 2DOF motor control system using a reference feedforward compensator according to one or more embodiments.

FIG. 9 depicts another configuration of a 2DOF motor control system using a reference feedforward compensator according to one or more embodiments. The illustration includes the blocks of the motor control system 100 discussed so far, with the current regulator 220 being a typical 1DOF compensator block 610 that receives the current error $I_c$ and generates a corresponding voltage command component. In addition, the configuration includes the current command compensator block 720 that receives the current command $I_c$ and generates a corresponding voltage command component. Further, at 740, the voltage command component ($V_D$) caused by the disturbance d is added with the voltage command components from the compensator 610 and the command compensator 720 to generate the voltage command V*.

The voltage command of this current regulator may be expressed as:

$$V^* = DX + RI_c + C(I_c - I_m)$$
$$= DX + (R + C)I_c - CI_m$$

Accordingly, in the configuration of FIG. 9, the current command and the measured current are separate parameters that can be used to adjust the current regulation, by controlling C and R (=2 DOF).

Figure 10:
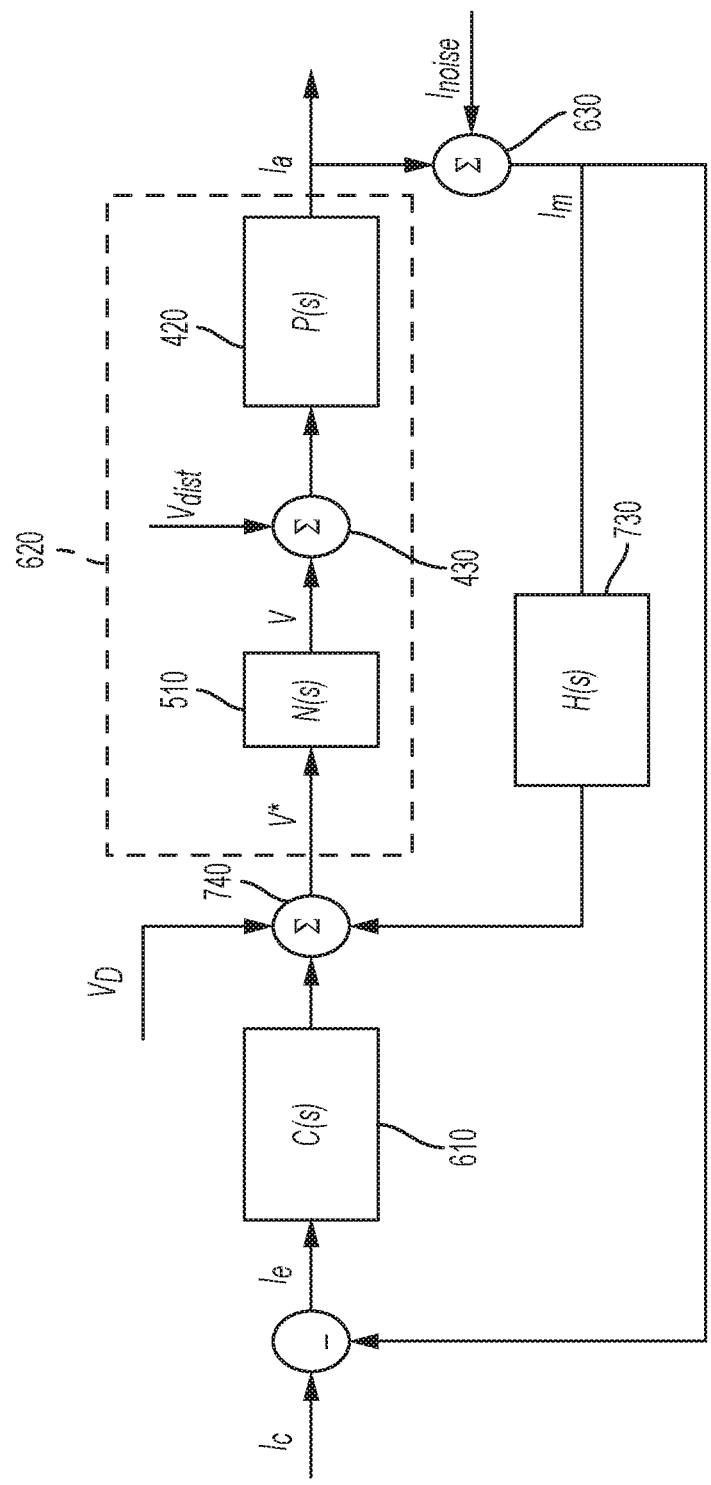
FIG. 10 depicts another configuration of a 2DOF motor control system using a state feedback compensator according to one or more embodiments.

FIG. 10 depicts another configuration of a 2DOF motor control system using a state feedback compensator according to one or more embodiments. The illustration includes the blocks of the motor control system 100 discussed so far, with the current regulator 220 being a typical 1DOF compensator block 610 that receives the current error $I_e$ and generates a corresponding voltage command component. In addition, the configuration includes the measured current compensator block 730 that receives the measured current $I_m$ and generates a corresponding voltage command component. Further, at 740, the voltage command component ($V_D$) caused by the disturbance d is added with the voltage command components from the compensator 610 and the measured current compensator 730 to generate the voltage command V*.

The voltage command of this regulator structure may be expressed as follows.

$$V^* = DX + C(I_c - I_m) + HI_m$$
$$= DX + CI_c + (H - C)I_m$$

Accordingly, in the configuration of FIG. 10, the current command and the measured current are separate parameters that can be used to adjust the current regulation, by controlling C and H (=2 DOF).

It should be noted that the above configurations are examples, and that in one or more embodiments, the configuration of the one or more compensators described herein may be varied to generate different voltage commands than those explicitly described herein. These different configurations allow the control system designer to implement the individual compensators more intuitively.

In one or more examples, additional tuning variables may be changed in order to perform response optimization for different applications of the PMDC machine. The following description describes one or more embodiments that utilize some of the structures mentioned above that result in targeted closed loop transfer functions which produce tracking, disturbance rejection as well as noise transmission characteristics of at least predetermined levels.

Figure 11:
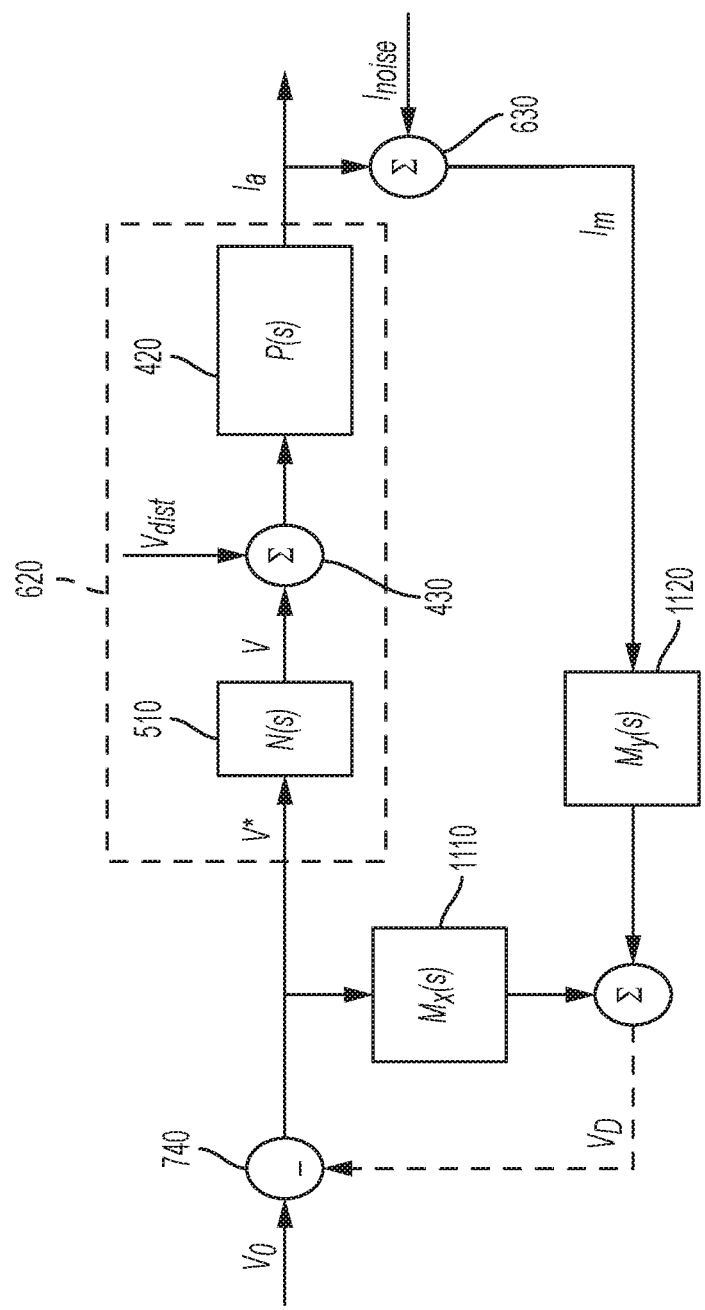
FIG. 11 depicts a block diagram of a motor control system that uses an observer based disturbance compensator according to one or more embodiments.

FIG. 11 depicts a block diagram of a motor control system that uses an observer based disturbance compensator according to one or more embodiments. The illustration does not include all of the blocks that have been described so far, rather, FIG. 11 depicts a voltage command component $V_0$ as input to the block 740, $V_0$ including the components from other compensators in the motor control system 100. In addition, the power converter and plant blocks are depicted to depict the loop used by an observer based disturbance compensator that includes a first matrix block 1110 and a second matrix block 1120. Here, the observer is modeled as a dual-input-single-output transfer matrix, with the individual elements of the matrix shown by the first transfer function block 1110 and the second transfer function block 1120, respectively. The disturbance estimate may then be expressed as follows.

$$V_D = M_y I_m + M_x V^*$$

Here, $M_x$ and $M_y$ are transfer functions that represent the observer dynamics and in general contain estimated motor/control parameters along with the observer gains.

It should be noted that the plant model in this configuration is an "effective plant", which must be controlled by the design and inclusion of compensators that produce $V_0$. By adding the individual compensators, dynamics of the voltage to current loop changes. For instance, in case of the above observer based disturbance compensator, the effective dynamics of the voltage $V_0$ to actual current $I_a$ are changed. Next, the transfer function of the effective plant is determined (ignoring delays). The transfer functions describing the system response is given as follows.

$$I_a = L_{pf} V_0 + L_{nf} I_{noise} + L_{df} V_{dist}$$

$$L_{pf} = (I + PN(I+M_x)^{-1} M_y)^{-1} PN(I+M_x)^{-1}$$

$$L_{nf} = -(I + PN(I+M_x)^{-1} M_y)^{-1} PN(I+M_x)^{-1} M_y$$

$$L_{df} = (I + PN(I+M_x)^{-1} M_y)^{-1} P$$

Here $L_{pf}$ represents the effective plant transfer function. By setting $N(s) \approx 1$ and assuming different actual and estimated parameters, the effective plant transfer function is obtained as follows.

$$I_a(s)|_p = L_{pf}(s) V_0(s)$$

$$= \frac{\frac{1}{Ls+R}\left(s(\hat{L}s + 2x\hat{R}) + \frac{x^2 \hat{R}^2}{\hat{L}}\right)}{\left(s(\hat{L}s + 2x\hat{R}) + \frac{x^2 \hat{R}^2}{\hat{L}}(\hat{L}s + \hat{R})\frac{1}{Ls+R}\right)} V_0(s)$$

Here x is an observer gain scaling factor which dictates how fast the observer dynamics are when compared to plant dynamics. Note that the final observer transfer function used to obtain $L_{pf}$ is shown for the special case when the observer gains are configured to be a scalar factor x times faster than the plant poles. In the equations, the "hat" (^) implies estimated parameter values. If the parameters are assumed to be accurate, i.e., actual and estimated parameters are equal, the effective plant transfer function becomes as follows.

$$L_{pf}(s) = \frac{1}{Ls+R}$$

The effective plant does not get changed from its original form. The original plant may still be used to develop compensators that produce $V_0$. The advantage of adding the disturbance compensator is that the disturbance rejection properties improve without affecting the plant dynamics. The effective disturbance rejection transfer function $L_{df}$ may be obtained as follows.

$$L_a(s)|_{dist} = L_{df}(s) V_{dist}(s)$$

$$= \frac{\frac{1}{Ls+R}\left(s(\hat{L}s + 2x\hat{R})\right)}{\left(s(\hat{L}s + 2x\hat{R}) + \frac{x^2 \hat{R}^2}{L}(\hat{L}s + \hat{R})\frac{1}{Ls+R}\right)} V_{dist}(s)$$

The effective disturbance rejection transfer function can be further expressed as follows using the parameters.

$$L_{df}(s) = \frac{1}{Ls+R} \frac{Ls^2 + 2xRs}{\left(Ls^2 + 2xRs + \frac{x^2 R^2}{L}\right)}$$

Using the above expression, the disturbance rejection properties of the current control system may be changed by changing x without affecting plant dynamics.

In the description from here on, the disturbance compensator 210 is considered be present in the current control loop even if not explicitly shown, however it is understood that the technical solutions described are applicable and extendable to other configurations as well.

The goal of the next few current control designs is to obtain a specific closed loop transfer function order. For this, the base current regulator with state feedback configuration (FIG. 10) is chosen, and the individual compensator transfer functions are obtained in terms of estimated machine parameters. In real-time operation, the parameters may be actively estimated parameters considering different nonlinearities such as temperature variation, magnetic saturation etc.

Figure 12:
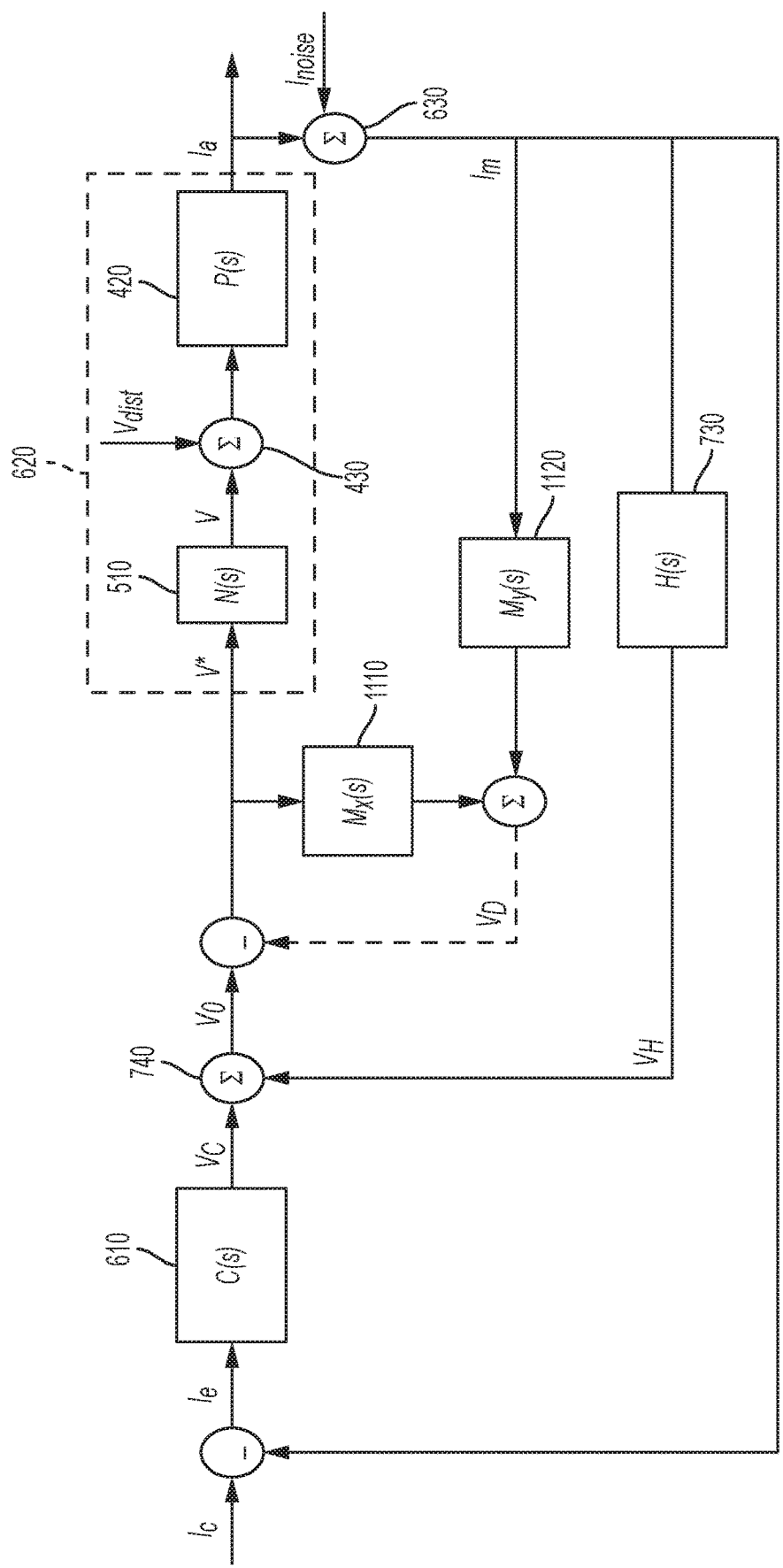
FIG. 12 depicts a block diagram of a current regulator with state feedback as well as observer based disturbance compensation according to one or more embodiments.

FIG. 12 depicts a block diagram of a current regulator with state feedback as well as observer based disturbance compensation according to one or more embodiments. The transfer functions for this configuration are given as follows.

$$I_a = T_d I_c + T_n I_{noise} + T_d V_{dist}$$

$$T_a = (I + PN(I+M_x)^{-1}(M_y + C - H))^{-1} PN(I+M_x)^{-1} C$$

$$T_n = (I + PN(I+M_x)^{-1}(M_y + C - H))^{-1} PN(I+M_x)^{-1}(H - C - M_y)$$

$$T_d = (I + PN(I+M_x)^{-1}(M_y + C - H))^{-1} P$$

In order to obtain specific transfer function orders for the closed loop current control transfer function $T_a$ the state feedback compensator H(s) (block 730) is set to $-R_0$ and the forward path error compensator C(s) (block 610) is a PI controller. $R_0$ is a value that can be tuned/calibrated. With this, the transfer function $T_a$ is obtained and simplified (assuming accurate parameter estimation) as follows.

$$T_a(s) = \frac{I_a(s)}{I_c(s)} = \frac{(K_p s + K_i)(\tilde{L}s^2 + (\hat{R} + L_1)s + L_2)}{s(\hat{L}s + \hat{R} + L_1)(Ls^2 + (R + R_o + K_p)s + K_i) + L_2(\hat{L}s^2 + (\hat{R} + R_o + K_p)s + K_i)}$$

$$= \frac{K_p s + K_i}{Ls^2 + (R + R_o + K_p)s + K_i}$$

In order to obtain a first order closed loop response with a specific bandwidth $\omega_b$ the individual gains may be set as follows.

$$K_p = \omega_b \tilde{L}$$

$$K_i = \omega_b (\tilde{R} + R_0)$$

In this case, the parameters $R_0$ and $\omega_b$ are inputs based on desired performance, while the PI gains are computed online using the parameters along with estimated machine parameters in real-time. It should be noted that the variables $R_0$ and $\omega_b$ may be scheduled as a function of other signals to obtain performance enhancements. With these settings, the closed loop transfer function becomes as follows.

$$T_a = \frac{\omega_b}{s + \omega_b}$$

Figure 13:
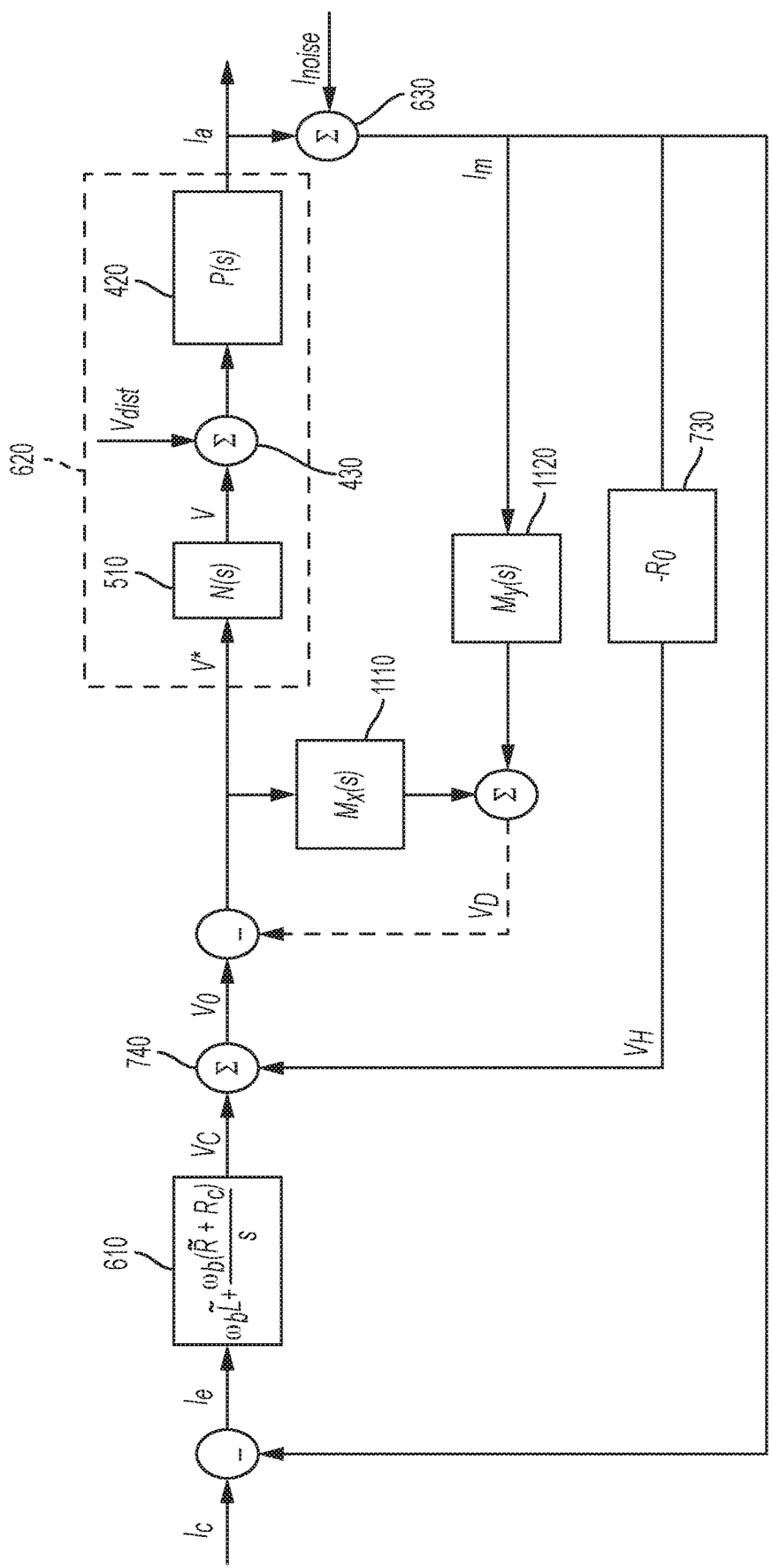
FIG. 13 depicts a block diagram of the first order transfer function system according to one or more embodiments.

FIG. 13 depicts a block diagram of the first order transfer function system according to one or more embodiments. Further, in this setting/configuration, the disturbance rejection transfer function (ignoring disturbance compensation) becomes as follows.

$$T_d(s) = \frac{s}{Ls^2 + (R + R_o + K_p)s + K_i}$$

$$= \frac{s}{(s + \omega_b)(Ls + R + R_0)}$$

Hence, the disturbance rejection properties may be further improved by tuning $R_0$ without affecting the closed loop transfer function. The term $R_0$ is referred to here is a "virtual resistance" term, which, while not explicitly shown, is a state feedback term that results in an effective plant transfer function. The virtual resistance adds to the plant matrix as an additional resistance term. Accordingly, in the embodiments described herein, a first order transfer function is obtained for the current regulation.

To obtain a second order closed loop transfer function, the various compensators may be picked differently. For example, consider using the following transfer functions for the feedback compensator 730 and the current regulator 610, respectively.

$$H(s) = -2\zeta \omega_n \tilde{L} + \tilde{R}$$

$$C(s) = \frac{\omega_n^2 \tilde{L}}{s}$$

Here $\omega_n$ and $\zeta$ represent the desired natural frequency and damping ratio of the second order transfer function. Thus, in this case, the forward path compensator 610 is a pure integral controller and the state feedback compensator 730 is a gain which is set to the value above (computed online).

Figure 14:
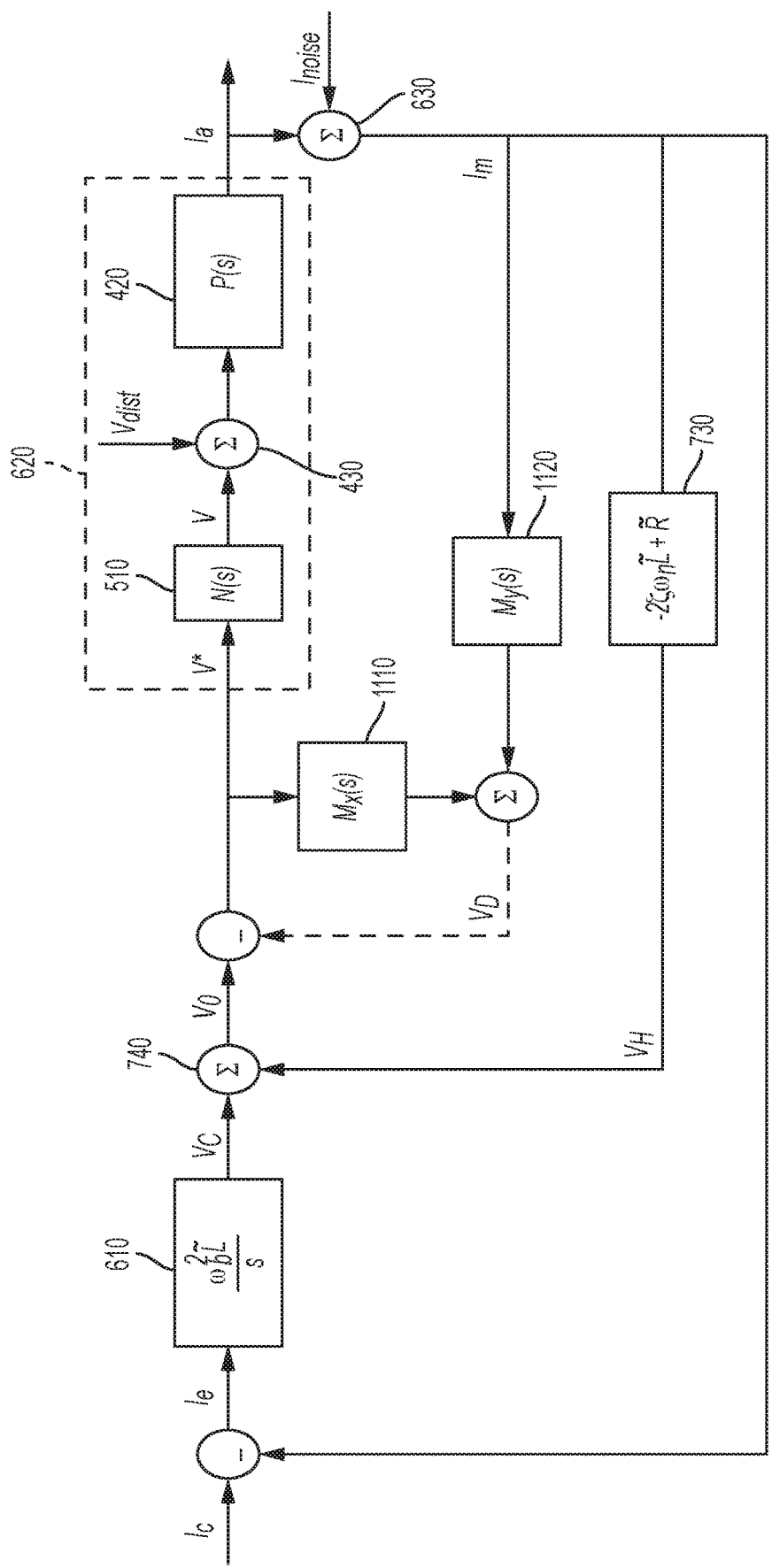
FIG. 14 depicts a block diagram of the second order transfer function system according to one or more embodiments.

FIG. 14 depicts a block diagram of the second order transfer function system according to one or more embodiments. As can be seen the current regulator 610 and the feedback compensator 730 are modified to use the above transfer functions to adjust the current regulation using second order transfer functions. The current regulator 610 is tuned by changing natural frequency ($\omega_n$) and damping ratio ($\zeta$). The motor parameter estimates are used in order to compute the controller gains/parameters which include the tunable parameters such as the natural frequency and the damping ratio.

Figure 15:
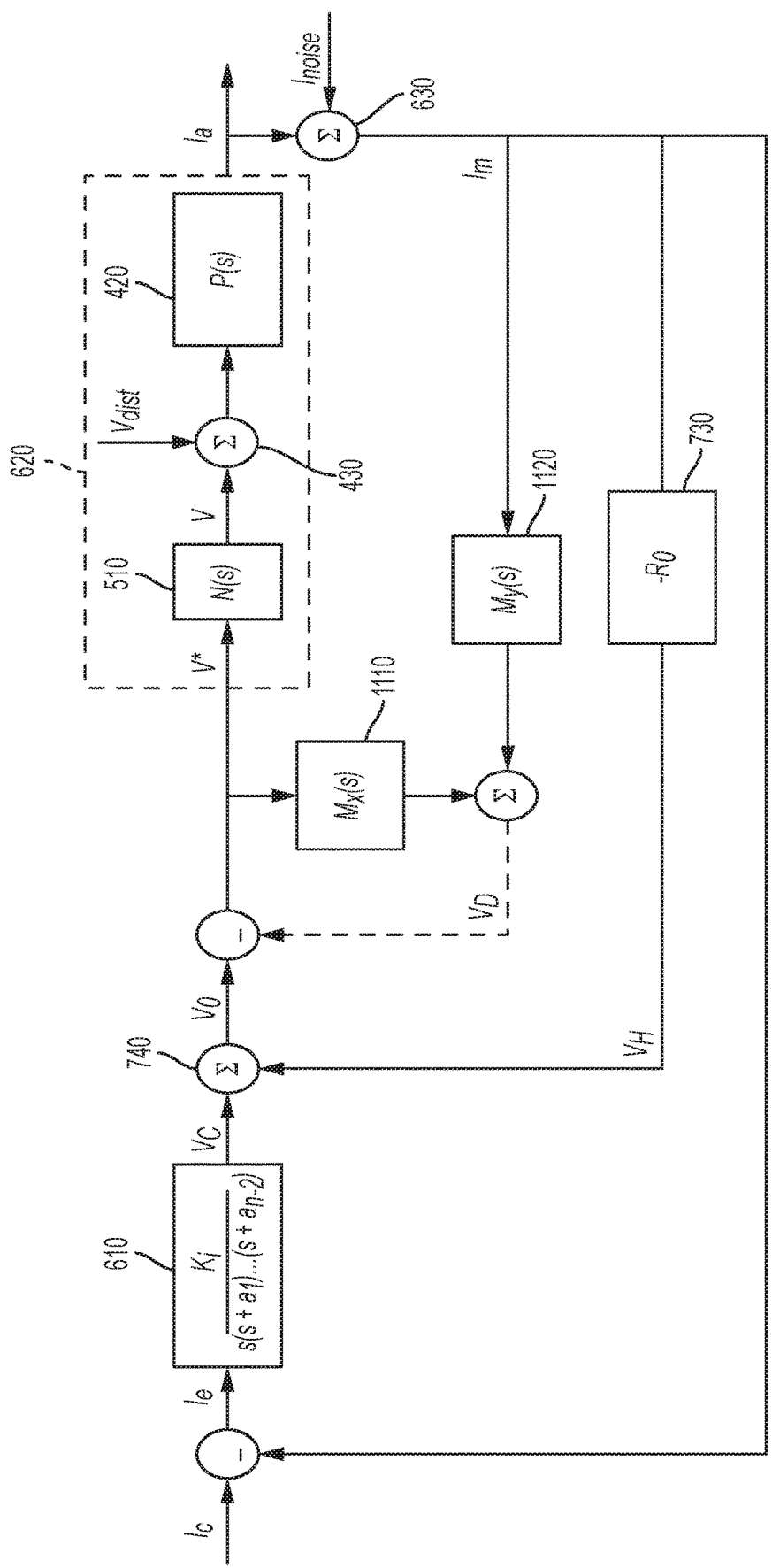
FIG. 15 depicts a block diagram of an $n^{th}$ order transfer function system according to one or more embodiments.

The current regulator may be further modified to obtain $n^{th}$ order transfer function. FIG. 15 depicts a block diagram of the $n^{th}$ order transfer function system according to one or more embodiments. As illustrated, this configuration uses a different configuration for the forward path compensator 610 as shown in the FIG. 15. The control system 100 uses multiple tunable parameters for obtaining the specific order desired. For instance, for $n^{th}$ order response, the current regulator has at least n tunable parameters. In this case, the desired transfer function is of the form shown below.

$$T_a(s) = \frac{p_1 p_2 \cdots p_n}{(s + p_1)(s + p_2) \cdots (s + p_n)}$$

The individual parameters may be determined in order to obtain a response, for instance, as follows.

$$T_a(s) = \frac{\omega^n}{(s + \omega)^n}$$

Figure 16:
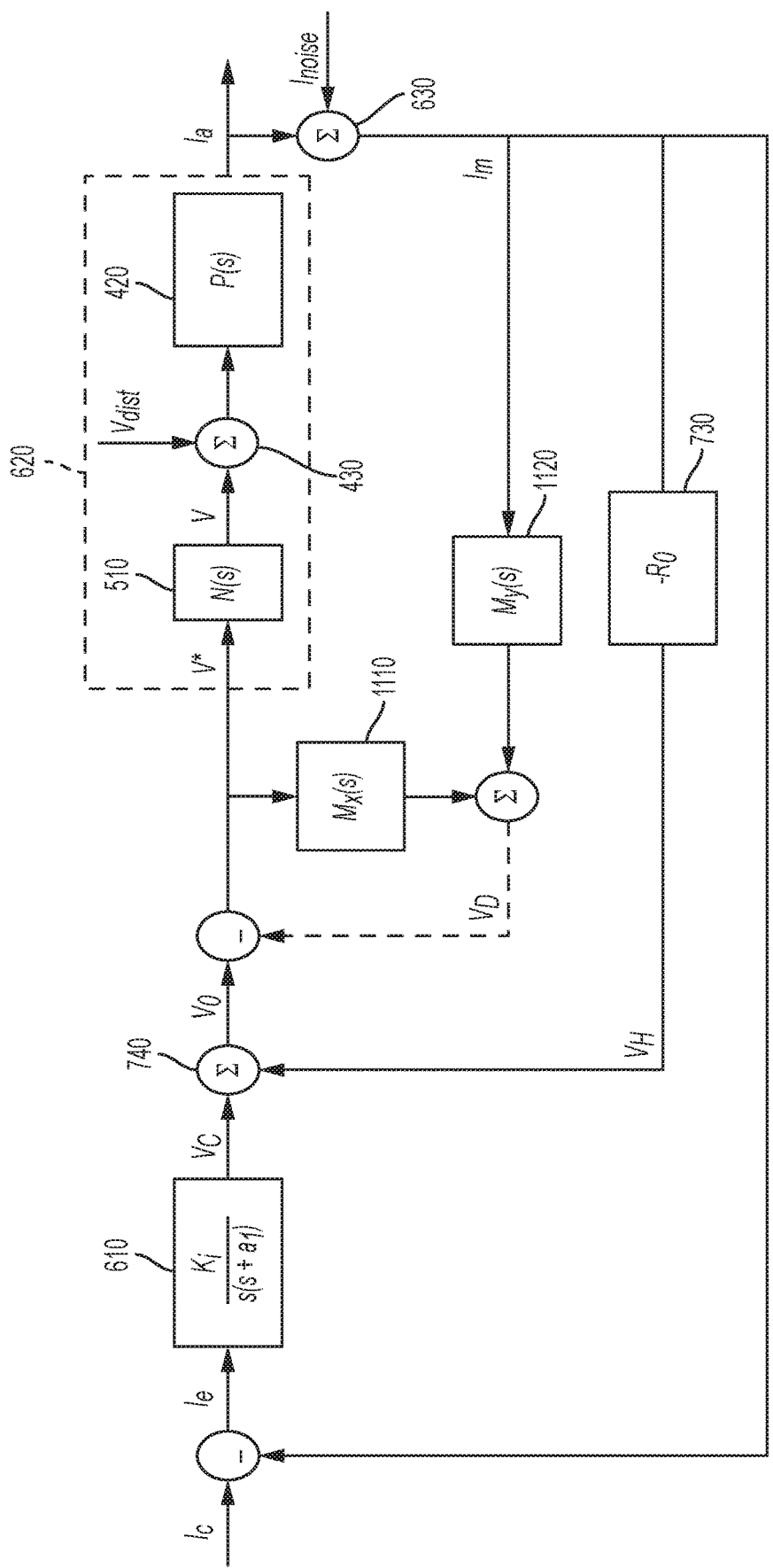
FIG. 16 depicts a block diagram of a third order transfer function system according to one or more embodiments.

As an example, the above design is used to obtain a third order transfer function as shown in FIG. 16. In this case, the closed loop transfer function is obtained as follows.

$$T_a(s) = \frac{\frac{K_i}{L}}{s^3 + s^2 \frac{(R + R_o + \alpha_1 L)}{L} + s \frac{\alpha_1 (R + R_o)}{L} + \frac{K_i}{L}}$$

where $K_i$, $\alpha_1$, $R_0$ may be chosen in order to place poles at any desired locations. If the all poles are to be placed at the same locations, say $s = -\omega$, then the characteristic desired and actual polynomials may be compared to find the tunable parameters.

$$(s + \omega)^n \leftrightarrow s^3 + s^2 \frac{(R + R_o + \alpha L)}{L} + s \frac{\alpha (R + R_o)}{L} + \frac{K_i}{L}$$

By comparing both sides, the three parameters may be determined the following equations.

$$\frac{K_i}{L} = \omega^3$$

$$\alpha + \frac{R + R_o}{L} = 3\omega$$

$$\alpha \frac{R + R_o}{L} = 3\omega^2$$

It should be noted that different types of C(s) (block 610) may be chosen if the n$^{th}$ order closed loop response needs to have certain number of zeros in addition to n poles.

The above embodiments described herein are for the configuration where the feedback compensator is included in the current loop to provide a 2DOF current control architecture. As another illustration of the 2DOF current control architecture, a second order closed loop transfer function response is obtained using the current controller with a pre-compensator configuration (FIG. 8).

Figure 17:
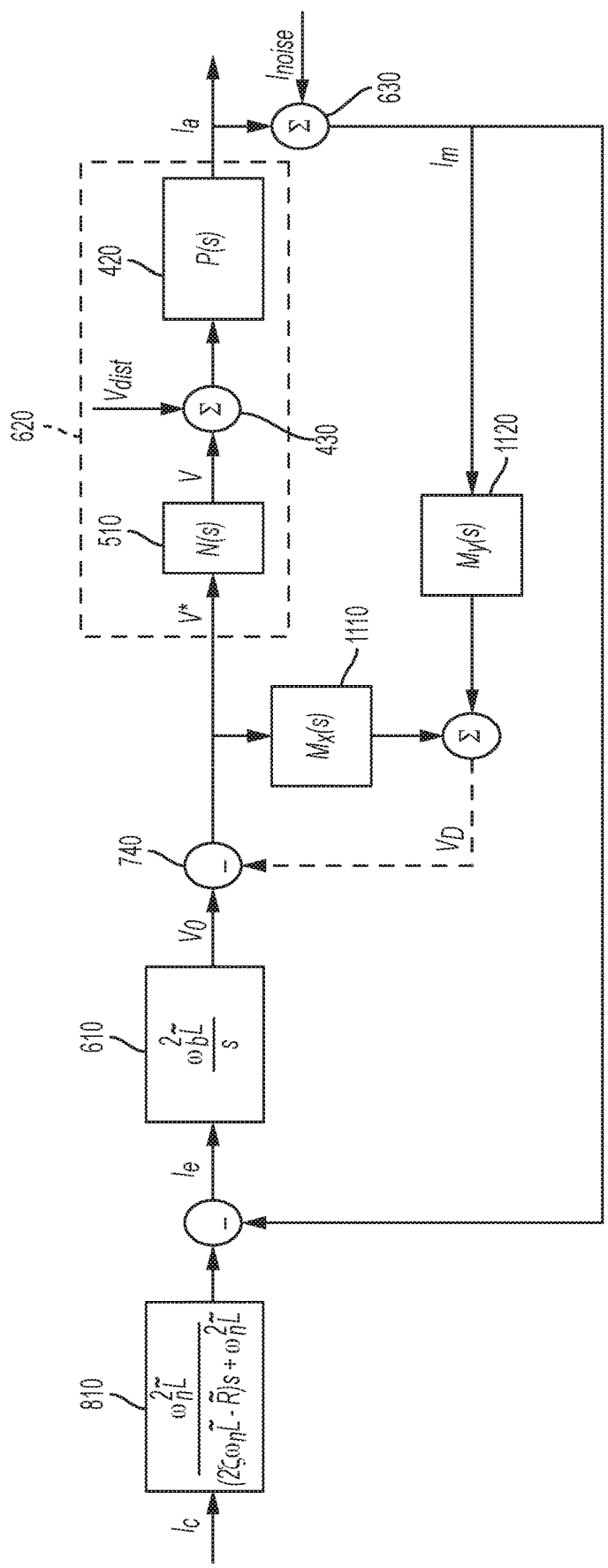
FIG. 17 depicts a control system with a second order closed loop transfer function response using a pre-compensator block according to one or more embodiments.

FIG. 17 depicts a control system with a second order closed loop transfer function response using a pre-compensator block according to one or more embodiments. In this case, the pre-compensator (B(s)) 810 and forward path compensator (C(s)) 610 are chosen as follows.

$$C(s) = 2\zeta\omega_n \tilde{L} - \tilde{R} + \frac{\omega_n^2 \tilde{L}}{s}$$

$$B(s) = \frac{\omega_n^2 \tilde{L}}{(2\zeta\omega_n \tilde{L} - \tilde{R})s + \omega_n^2 \tilde{L}}$$

It should be noted that the equations described herein use "s", which represents the derivative operation in continuous time (as opposed to discrete time), to describe one or more transfer functions of the compensators for simplicity. Because the implementation of the compensators is typically done in a digital controller, the calculations are performed using discrete time math. For discrete time implementation, therefore, s may be replaced by an appropriate estimate or approximation of the derivative operator, which may be represented by ŝ. Note that the discrete time implementation of the compensators may be performed by conversion from analog (continuous time) to digital (discrete time) domain using any of the commonly known transformation methods such as the bilinear transform, or by directly designing the compensators in discrete time using various digital filter design techniques, and so on.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

The invention claimed is:

1. A motor control system for a permanent magnet DC (PMDC) machine, the motor control system comprising:
   one or more sensors for measuring an output current of the PMDC machine; and
   a current regulator configured to generate a voltage command in response to receiving an input current command, the voltage command is applied to the PMDC machine for generating an amount of torque corresponding to the input current command, the current regulator comprising:
   a current command compensator configured to generate a first voltage command based on the input current command received by the current regulator and at least one estimated machine parameter;
   a feedback compensator configured to generate a second voltage command based on the output current measured by the one or more sensors; and
   an adder configured to generate the voltage command by adding the first voltage command and the second voltage command, such that a closed loop current control approximates a transfer function, wherein the transfer function includes a first order transfer function, a second order transfer function, or a higher order transfer function.

2. The motor control system of claim 1, wherein the current command compensator generates the first voltage command using a difference between the input current command and the output current measured by the one or more sensors.

3. The motor control system of claim 1, wherein the current regulator further comprises:
   a disturbance compensator configured to generate a third voltage command based on a feedforward disturbance; and
   the adder being configured to generate the voltage command by further adding the third voltage command.

4. The motor control system of claim 1, further comprising:
   a power converter configured to receive the voltage command from the current regulator and generate pulse width modulated voltage signals for the PMDC machine based on a predetermined frequency.

5. The motor control system of claim 1, wherein the second transfer function of the feedback compensator is set to −R0, R0 being a configurable value received as input.

6. The motor control system of claim 1, wherein the first transfer function of the current command compensator is set to $$\omega_b \tilde{L} + \frac{\omega_b(\tilde{R} + R_0)}{\hat{s}}, R_0$$

and $\omega_b$ are inputs, $\tilde{R}$ is an estimated resistance of the motor control system, $\tilde{L}$ is an estimated inductance of the motor control system, and $\omega_b$ is a predetermined bandwidth of the current regulator.

7. A method for controlling operation of a permanent magnet DC (PMDC) machine, the method comprising:
   measuring, using one or more sensors, an output current of the PMDC machine; and
   generating, by a current regulator, a voltage command in response to receiving an input current command, and applying the voltage command to the PMDC machine for generating an amount of torque corresponding to the input current command, generating the voltage command comprising:
   generating, by a current command compensator, a first voltage command based on the input current command received by the current regulator and at least one estimated machine parameter;
   generating, by a feedback compensator, a second voltage command based on the output current measured by the one or more sensors; and
   generating, by an adder, the voltage command by adding the first voltage command and the second voltage command, such that a closed loop current control approximates a transfer function, wherein the transfer function includes a first order transfer function, a second order transfer function, or a higher order transfer function.

8. The method of claim 7, wherein the first voltage command is generated using a difference between the input current command and the output current measured by the one or more sensors.

9. The method of claim 7, wherein generating the voltage command further comprises:
   generating, by a disturbance compensator, a third voltage command based on a feedforward disturbance; and
   generating, by the adder, the voltage command by further adding the third voltage command.

10. The method of claim 7, further comprising:
    receiving, by a power converter, the voltage command from the current regulator and generating pulse width modulated voltage signals for the PMDC machine based on a predetermined frequency.

11. The method of claim 7, wherein the second transfer function of the feedback compensator is set to $-R0$, $R0$ being a configurable value received as input.

12. The method of claim 7, wherein the first transfer function of the current command compensator is set to $$\omega_b \tilde{L} + \frac{\omega_b(\tilde{R} + R_0)}{\hat{s}}, R_0$$

and $\omega_b$ are inputs, $\tilde{R}$ is an estimated resistance of the PMDC machine, $\tilde{L}$ is an estimated inductance of the PMDC machine, and $\omega_b$ is a predetermined bandwidth of the current regulator.

13. A motor control system for a permanent magnet DC (PMDC) machine, the motor control system comprising:
    one or more sensors for measuring an output current of the PMDC machine; and
    a current regulator configured to generate a voltage command in response to receiving an input current command, the voltage command is applied to the PMDC machine for generating an amount of torque corresponding to the input current command, the current regulator comprising:
       a current command compensator configured to generate a first voltage command based on the input current command received by the current regulator;
       a feedback compensator configured to generate a second voltage command based on the output current measured by the one or more sensors; and
       an adder configured to generate the voltage command by adding the first voltage command and the second voltage command, wherein an order of a transfer function response of the current regulator is tuned based on a first transfer function of the current command compensator and a second transfer function of the feedback compensator, and wherein the second transfer function of the feedback compensator is set to $-R0$, $R0$ being a configurable value received as input.

14. The motor control system of claim 13, wherein the current command compensator generates the first voltage command using a difference between the input current command and the output current measured by the one or more sensors.

15. The motor control system of claim 13, wherein the current regulator further comprises:
    a disturbance compensator configured to generate a third voltage command based on a feedforward disturbance; and
    the adder being configured to generate the voltage command by further adding the third voltage command.

16. The motor control system of claim 13, further comprising:
    a power converter configured to receive the voltage command from the current regulator and generate pulse width modulated voltage signals for the PMDC machine based on a predetermined frequency.

* * * * *